United States Patent
Esly

(10) Patent No.: US 12,301,062 B2
(45) Date of Patent: May 13, 2025

(54) ROTOR WITH AN OPTIMIZED ROTOR LAMINATE GEOMETRY FOR FLUID GUIDANCE

(71) Applicant: Schaeffler Technologies AG & Co. KG, Herzogenaurach (DE)

(72) Inventor: Florian Esly, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 332 days.

(21) Appl. No.: 17/609,082

(22) PCT Filed: Apr. 16, 2020

(86) PCT No.: PCT/DE2020/100308
§ 371 (c)(1),
(2) Date: Nov. 5, 2021

(87) PCT Pub. No.: WO2020/233736
PCT Pub. Date: Nov. 26, 2020

(65) Prior Publication Data
US 2022/0231558 A1    Jul. 21, 2022

(30) Foreign Application Priority Data
May 21, 2019    (DE) .......................... 102019113456.0

(51) Int. Cl.
*H02K 1/32*    (2006.01)
*H02K 1/276*    (2022.01)
*H02K 9/197*    (2006.01)

(52) U.S. Cl.
CPC ............... *H02K 1/32* (2013.01); *H02K 1/276* (2013.01); *H02K 9/197* (2013.01)

(58) Field of Classification Search
CPC .......... H02K 1/32; H02K 1/276; H02K 9/197; H02K 15/028; H02K 2201/06; H02K 1/28; H02K 7/00
See application file for complete search history.

(56) References Cited

U.S. PATENT DOCUMENTS

| 5,760,520 A | 6/1998 | Hasebe et al. |
| 2012/0086291 A1 | 4/2012 | DeBlock et al. |

(Continued)

FOREIGN PATENT DOCUMENTS

| DE | 102019112790 A1 * | 11/2020 | ............... H02K 1/32 |
| FR | 3034583 | 10/2016 | |

OTHER PUBLICATIONS

Translation of DE-102019112790-A1 retreived from IP.com Dec. 14, 2023. 2023.*

(Continued)

*Primary Examiner* — Christopher M Koehler
*Assistant Examiner* — Riley Owen Stout
(74) *Attorney, Agent, or Firm* — Volpe Koenig

(57) ABSTRACT

A rotor (1) for an electrical machine, including a rotor laminated core (2) which has a plurality of axially layered rotor laminates (3) which are each arranged at a predetermined rotation angle in relation to an axially adjacent rotor laminate (3), and including a rotor shaft (4) on which the rotor laminates (3) are fitted. The rotor shaft (4) forms a torque-transmitting connection (5) with slots (6) which are formed in the rotor laminates (3), and the rotation angle and the width of the slots (6) are matched to one another such that a duct (10), which extends axially through the rotor (1), for fluid guidance is formed.

18 Claims, 3 Drawing Sheets

(56) References Cited

U.S. PATENT DOCUMENTS

| | | | |
|---|---|---|---|
| 2015/0069863 A1* | 3/2015 | Papini | H02K 1/2766 |
| | | | 310/46 |
| 2015/0380997 A1* | 12/2015 | Song | H02K 1/2773 |
| | | | 29/598 |
| 2019/0207449 A1* | 7/2019 | Fröhlich | H02K 1/30 |

OTHER PUBLICATIONS

Translation of DE-102019112790-A1 retreived from IP.com Dec. 14, 2023. 2023. (Year: 2023).*

* cited by examiner

ROTOR WITH AN OPTIMIZED ROTOR LAMINATE GEOMETRY FOR FLUID GUIDANCE

CROSS-REFERENCE TO RELATED APPLICATIONS

This application is the U.S. National Phase of PCT Appln. No. PCT/DE2020/100308, filed Apr. 16, 2020, which claims priority from German Patent Application No. 10 2019 113 456.0, filed May 21, 2019, the entire disclosures of which are incorporated by reference herein.

TECHNICAL FIELD

The disclosure relates to a rotor for an electrical machine, having a rotor laminated core, which has a plurality of axially layered rotor laminates, each of which are arranged at a predetermined rotation angle to an axially adjacent rotor laminate, and having a rotor shaft on which the rotor laminates are fitted, wherein the rotor shaft forms a torque-transmitting connection with slots formed in the rotor laminates.

Rotors for electrical machines which are composed of laminated cores, what are termed "rotor stacks" or "stacks", are already known from the prior art. These laminated cores are usually connected to a shaft with a positive fit via a tongue and slot connection or with a friction fit via a press connection. If the electrical machine is arranged in the oil chamber, the oil/hydraulic medium/fluid/coolant can be used, among other things, to cool the rotor. For this purpose, an oil guide is required in the rotor shaft, through which the oil is conveyed radially through the rotor shaft to the rotor laminated core or the rotor laminated cores.

However, the prior art always has the disadvantage that an opening or a duct is required in the rotor laminates to lead the oil axially outwards. For this purpose, an additional opening is usually provided in the rotor core. In particular if the rotor laminates need to be staggered and therefore a large number of slots for torque transmission must be formed in the rotor laminates via a tongue and slot connection, the slots and/or the tongue are arranged differently in each rotor laminate, so that often no installation space for an oil guide opening is available through the many offset slots.

SUMMARY

It is therefore the object of the disclosure to avoid or at least to mitigate the disadvantages of the prior art. In particular, a rotor is to be provided which, on the one hand, is simple and inexpensive to manufacture and which provides, in a particularly simple manner, for example, a coolant guide which axially distributes coolant that is passed through the rotor shaft.

This object is achieved according to the disclosure in a device of the generic type in that the rotation angle and the width of the slots are matched to one another in such a way that a duct extending axially through the rotor for fluid guidance, in particular cooling (oil) guidance, is formed. This means that the slots of axially adjacent rotor laminates are arranged at least partially overlapping, so that the slots are axially connected to one another. This has the advantage that the slots in the rotor laminates, which must be provided for torque transmission, also serve as oil guide slots. As a result, it is advantageous to not need to keep an additional, specially defined opening in the laminated core.

Advantageous embodiments are explained below.

According to an advantageous embodiment, a plurality of slots can be formed in each rotor laminate, at least one of the slots serving for torque transmission and at least one other of the slots serving for fluid guidance. This ensures the torque transmission and the fluid guidance at the same time.

It is also expedient if the rotor shaft is designed as a hollow shaft in which at least one radially continuously extending fluid duct which opens into the slots is formed. As a result, the interior of the rotor shaft is connected to the slots so that the coolant/fluid can be conveyed to the slots and can be further distributed axially from there.

Furthermore, it is preferred if at least as many slots are formed in each rotor laminate as the rotor laminates forming a rotor laminated core, with another of the slots forming the torque-transmitting connection depending on the axial position in the rotor laminated core. This enables the staggering of the rotor laminates to be achieved in a particularly simple manner by selecting a specific slot in the rotor laminate. In other words, for example, the second slot has a different rotation angle to the first rotor laminate in the axial direction than does the third slot, so that the second rotor laminate in the axial direction is connected to the rotor shaft via the second slot.

In addition, it is preferred if the slots that do not form the torque-transmitting connection are used for fluid guidance. Since several slots are formed in each rotor laminate, but only one of the slots (with a tongue and slot connection) is connected to the rotor shaft via a tongue, the other slots that are used in the rotor laminated core for torque transmission to the other rotor laminates, are available in the one rotor plate for the coolant supply.

According to a particularly preferred embodiment, the rotation angle can be selected in such a way that it provides for a staggering of the rotor laminates. This means that the rotation angle is different from a pole angle with which the poles of the rotor are arranged to be spaced apart in the circumferential direction, specifically in particular different from the pole angle by the rotational staggering angle. The staggering of the rotor is thus implemented in a particularly simple manner.

In an advantageous development, one of the slots that forms the torque-transmitting connection between the rotor shaft and a first rotor laminate can be combined with another of the slots that forms the torque-transmitting connection between the rotor shaft and a rotor laminate that is axially adjacent to the first rotor laminate, being arranged to be offset by the rotation angle. As a result, the rotational staggering of the rotor laminates described above is implemented.

It is also preferred if one of the slots that forms the torque-transmitting connection between the rotor shaft and a first rotor laminate to another of the slots that forms the torque-transmitting connection between the rotor shaft and a rotor laminate that is axially spaced apart from the first rotor laminate, is arranged to be offset by an angle different from the rotation angle. This is due in particular to the fact that the rotation angle is different from the pole angle so that the slots cannot be arranged to be evenly distributed. In particular, the slot which is assigned to the first rotor laminate in the axial direction for torque transmission is rotated by the angle different from the rotation angle to the slot which is assigned to the last rotor laminate in the axial direction for torque transmission.

It is also advantageous if the rotor shaft is connected to the slots for torque transmission formed in the rotor laminates by one or more tongue and slot connections. This can also influence the arrangement of the slots. In addition, the force distribution is improved.

It is particularly advantageous when the rotor laminates are designed as identical parts. As a result, the rotor laminates can be produced with the same tool, for example with a punching tool. The rotor can thus be manufactured inexpensively. In addition, the fact that only one type of rotor laminate is required prevents a certain type of rotor laminate from being missing in the assembly, for example due to a mix-up.

In other words, the disclosure relates to a laminated rotor core having a plurality of slots which are arranged with different spacings in the circumferential direction. The slots that are not used for torque transmission through a tongue and slot connection to a rotor shaft are arranged to be axially connected so that they can serve for fluid guidance. For fluid guidance, the rotor shaft has radial through holes to form a fluid duct from the holes to the slots, which are not used for torque transmission.

In addition, it is advantageous if the torque-transmitting connection is formed by slots formed in the rotor laminates and a coupling element which is constructed separately from the rotor laminates and which is connected to the rotor shaft in a rotationally fixed manner. In other words, in contrast to a classic tongue and slot connection for connecting the rotor laminates, the coupling element, such as the tongue, is formed separately. As a result, instead of a projection forming the coupling element, a slot into which the coupling element engages must be provided on the rotor laminate geometry. This advantageously results in greater design options for the rotor laminates, since several slots can also be provided and it is only necessary during assembly to select which slot is connected to the coupling element to achieve a specific orientation in the circumferential direction.

According to a preferred embodiment, the torque-transmitting connection can be designed as a tongue and slot connection, wherein the coupling element is designed separately from the rotor shaft. The coupling element is preferably designed as a tongue, for example in the manner of a parallel key. By designing the tongue as a separate component, the structural design of the rotor shaft does not need to be changed. In addition, a separate tongue can be produced in a particularly simple and cost-effective manner. Alternatively, it is also possible to form the coupling element integrally with the rotor shaft.

In particular, it is preferred if the rotor laminates are each arranged to be rotated by a predetermined angle with respect to an axially adjacent rotor laminate. As a result, a staggering of the rotor can advantageously be kept, which has a positive effect on the noise behavior. According to an advantageous embodiment, the rotor laminates are rotated with respect to one another by a constant angle.

In addition, it is advantageous if a plurality of slots are formed in each rotor laminate, which are arranged to be offset from one another by the predetermined angle. This makes it possible to implement the staggering of the rotor in that the slot into which the coupling element is inserted can be selected depending on the desired offset relative to the rotor shaft and thus relative to the other rotor laminates. This allows the rotation of the rotor laminates to be determined when the rotor laminates are installed. In addition, this makes it possible for the same rotor laminate to be used at different positions in the rotor laminated core, i.e., with different rotations relative to the rotor shaft. In other words, the "correct" slot for the torque-transmitting connection must be selected during assembly to realize the staggering.

It is also expedient if the rotor has a plurality of poles which are arranged to be uniformly distributed in the circumferential direction, the predetermined angle being selected such that the poles of the rotor are staggered. That is, the predetermined angle is different from a pole angle at which the poles are arranged to be in the circumferential direction. The staggering of the poles is thereby achieved via the axial direction of the laminated rotor core.

It is also preferred if each of the plurality of slots is assigned to a position of the rotor laminate in the rotor laminated core. This means that, depending on the intended position of the respective rotor laminate in the rotor laminated core, a different slot is used for the connection to the rotor shaft. In other words, each of the slots in the rotor laminate is assigned to exactly one position in the rotor laminated core.

In a preferred embodiment, the predetermined angle by which the slots are offset from one another in a rotor laminate can be the sum of a pole angle corresponding to an angular distance between the poles of the rotor, or a multiple of the pole angle and a rotational staggering angle by which the poles are rotationally staggered. The slots can thus be suitably distributed over the inner circumference of the rotor laminate so that they do not overlap one another.

It is particularly preferred if the rotor laminates are connected to the rotor shaft via several torque-transmitting connections. As a result, the force can be better transmitted between the rotor shaft and the rotor core. Correspondingly, for example, two slots per rotor laminate are connected to two slots in the rotor shaft via two coupling elements.

According to an advantageous development, the plurality of torque-transmitting connections can be arranged to be uniformly distributed in the circumferential direction. As a result, the power transmission is evenly distributed over the rotor laminates or evenly over the circumference of the rotor shaft.

In other words, the disclosure also relates to a rotor having a laminated core, wherein different slots are formed in the rotor laminates of the laminated core, having a shaft with a slot and with a tongue for torque transmission between a respective slot of a rotor laminate and the rotor shaft. According to the disclosure, the combination of a classic tongue and slot connection by means of a separate tongue and the use of differently arranged slots in the laminated core reduces the number of different rotor laminates, since the same rotor laminate can be used several times in the laminated rotor bundle. The slots are arranged in such a way that the correct rotational staggering angle is maintained for each slot. A different slot is used during assembly depending on the position of the laminated core. This ensures the correct rotational staggering angle of the laminated cores. The power is transmitted via one or more tongues, like a parallel key.

BRIEF DESCRIPTION OF THE DRAWINGS

The disclosure is explained below with the aid of drawings. In the figures.

DETAILED DESCRIPTION

The figures are only schematic in nature and serve only for understanding the disclosure. The same elements are provided with the same reference symbols.

Figure 1:
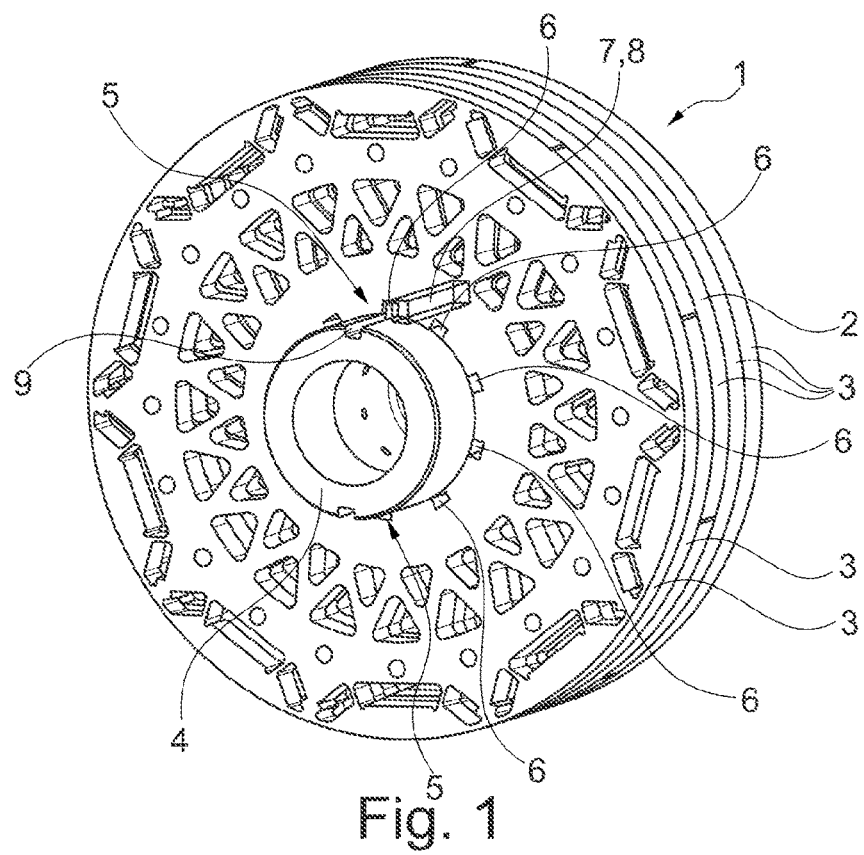
FIG. 1 shows a perspective representation of a rotor according to the disclosure.

FIG. 1 shows a rotor 1 according to the disclosure for an electric machine. The rotor 1 has a laminated rotor core 2 composed of a plurality of coated rotor laminates 3 layered in the axial direction. The laminated rotor core 2, more precisely, poles of the rotor 1 which are arranged in the laminated rotor core 2, has or have what is termed a staggering or rotation. This means that the rotor laminates 3 are arranged to be rotated by a predetermined rotation angle γ with respect to one another. In this way, a rotational staggering of the poles of the rotor 1 is achieved. In particular, the rotor laminates 3 are each arranged to be rotated by the rotation angle γ with respect to an axially adjacent rotor laminate 3. In particular, the rotation angle γ between axially adjacent rotor laminates 3 is constant.

The rotor 1 has a rotor shaft 4. The rotor laminates 3 are fitted onto the rotor shaft 4, in particular onto an outer circumference of the rotor shaft 4. The rotor shaft 4 is connected to the wheel 3 in a rotationally fixed manner. The rotor shaft 4 is connected to slots 6 formed in the rotor laminates 3 via a torque-transmitting connection 5. The connection 5 is formed by a coupling element 7, which is formed separately from the rotor laminates 3, and the slots 6 of the rotor laminates 3. In the embodiment shown, the coupling element 7 is formed separately from the rotor shaft 4, but can alternatively also be formed integrally with the rotor shaft 4, even if this is not shown. In the embodiment shown, the coupling element 7 is designed as a tongue 8, in particular in the manner of a parallel key. The tongue 8 engages in a slot 9 in the rotor shaft 4 and in the slots 6 of the rotor laminates 3 to fix the rotor laminates 3 on the rotor shaft 4 in a rotationally fixed manner by means of a form fit. In the embodiment shown, the connection 5 is thus designed as a tongue and slot connection. In the embodiment shown, each rotor laminate 3 is connected to the rotor shaft 4, in particular to the slots 9 of the rotor shaft 4, via two tongues 8. The rotor laminates 3 can, however, also be connected to the rotor shaft 4 via a tongue or via more than two tongues, even if this is not shown.

The slots 6 of the rotor laminates 3 are arranged on a radial inner circumference of the rotor laminates 3. The slots 6 extend in the axial direction continuously through the respective rotor laminate 3. The slots 6 have a substantially rectangular cross-section. The slots 6 each have the same cross-section, which corresponds to a partial cross-section of the coupling element 6 and/or a cross-section of the slot 9 in the rotor shaft 4.

Figure 2:
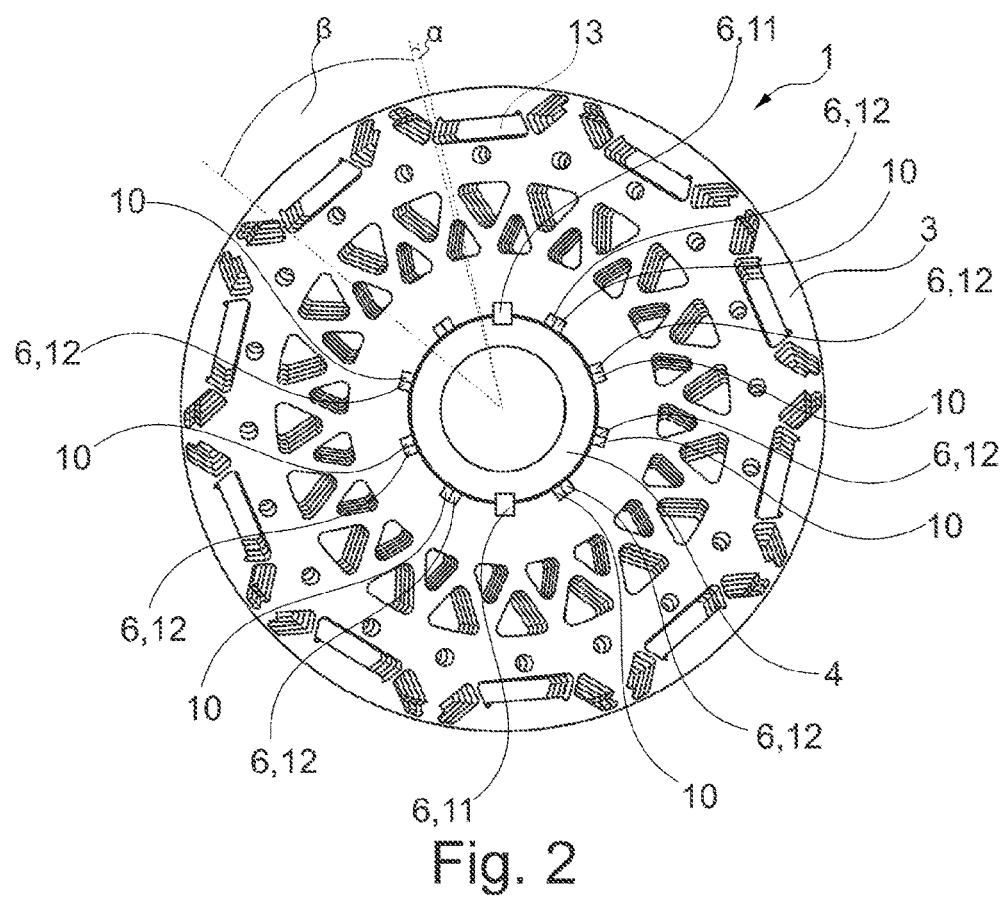
FIG. 2 shows a front view of the rotor.

FIG. 2 shows a front view of the rotor 1. In the rotor laminates 3, a plurality of slots 6, ten slots 6 in the embodiment shown, are arranged to be distributed over the inner circumference. The arrangement, the height and/or, in particular, the width of the slots 6 are matched to the rotation angle γ in such a way that the slots 6 form a duct 10 extending continuously through the rotor core 2 in the axial direction. The duct 10 can be used, for example, for coolant guidance for the rotor 1. Of the slots 6, at least one torque slot 11 is used to transmit torque and at least one other coolant slot 12 is used for coolant guidance.

The rotation of the laminated rotor core 2 can be clearly seen in the front view of FIG. 2. Pole recesses 13 for poles of the rotor 1 are provided in the rotor laminates 3. The pole recesses 13 are arranged in the rotor laminates 3 to be evenly distributed over the circumference. This means that the pole recesses 13 of a rotor laminate 3 are arranged to be spaced apart at constant angular intervals with a pole angle β. The pole angle β thus corresponds to 360° divided by the number of poles of the rotor 1, in the illustrated embodiment 36°. The pole recess 13 of a rotor laminate 3 is arranged to be rotated by the rotational staggering angle α to a pole recess 13 of an axially adjacent rotor laminate 3. This rotational staggering angle α and the resulting offset of the rotor laminates 3 can be seen in FIG. 2 on the pole recesses 13 (or on other recesses in the rotor laminates 3).

Each rotor laminate 3 of the rotor laminated core 2 has at least as many slots 6 as the rotor laminated core 2 has rotor laminates 3. The slots 6 are arranged in such a way that the predetermined rotational staggering angle α of the rotor laminates 3 is maintained thereby. In this case, a different slot 6 is used for each rotor laminate 3 of the rotor laminated core 2, depending on the position of the rotor laminate 3 in the rotor laminated core, via which the respective rotor laminate 3 is connected to the rotor shaft 4. In the embodiment shown, the laminated rotor core 2 is formed from five laminated rotor laminates 3. The laminated rotor core 2 can, however, also have fewer than five or more than five laminated rotor laminates 3, even if this is not shown. Accordingly, each rotor laminate 3 has at least five slots 6.

Figure 3:
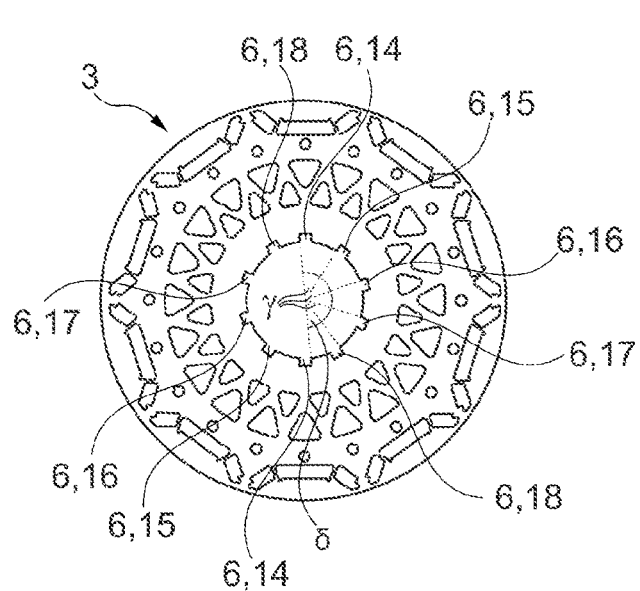
FIG. 3 shows a front view of a rotor laminate of the rotor.
Figure 4:
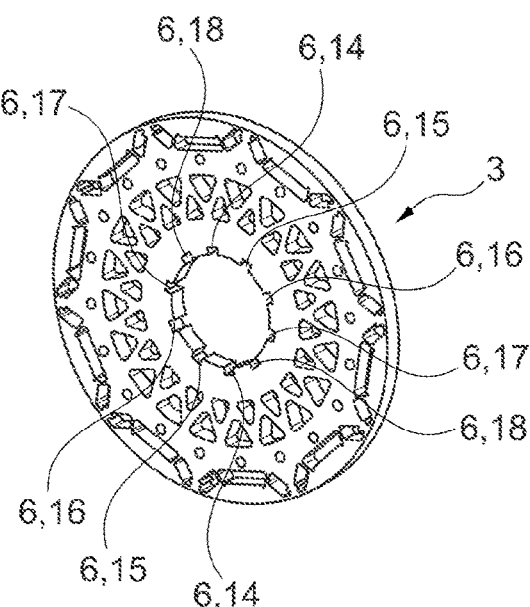
FIG. 4 shows a perspective sectional view of the rotor laminate.

An arrangement of the slots 6 is described with reference to FIGS. 3 and 4, in which a single rotor laminate 3 is shown. The rotor laminate 3 has a first slot 14, a second slot 15, a third slot 16, a fourth slot 17, and a fifth slot 18 of the slots 6. Depending on the position at which the rotor laminate 3 is arranged in the rotor laminated core 2, the first slot 14, the second slot 15, the third slot 16, the fourth slot 17, or the fifth slot 18 serves as the torque slot 11 via which the rotor laminate 3 is connected to the rotor shaft 4 in a torque-transmitting manner. For example, the first slot 14 is used for a first rotor laminate 3, which forms an axial end face of the rotor laminated core 2, as the torque slot 11, the second slot 15 for a second rotor laminate 3, which is axially adjacent to the first rotor laminate 3, as the torque slot 11, the third slot 16 for a third rotor laminate 3, which is axially adjacent to the second rotor laminate 3, as the torque slot 11, etc.

In this case, the first slot 14, the second slot 15, the third slot 16, the fourth slot 17, and the fifth slot 18 are formed in each rotor laminate 3, so that the position is established and the position corresponding to the position in the rotor laminated core 2 is only determined during assembly as the torque slot 11 is connected to the tongue 7. The remaining slots 6 are used as the coolant slots 12.

To achieve the staggering of the poles of the rotor 1, the arrangement of the slots 6 is matched to the rotational staggering angle α. In particular, an angular distance between the slots 6, in particular between the first slot 14 and the second slot 15, or between the second slot 15 and the third slot 16, or between the third slot 16 and the fourth slot 17, etc., corresponds to the rotation angle γ. The rotation angle γ corresponds to the sum of the rotational staggering angle α and the pole angle β or the sum of the rotational staggering angle α and a multiple of the pole angle β. In other words, the slots 6, which are provided as torque slot 11 for axially adjacent rotor laminates 3, for example the first slot 14 and the second slot 15, are arranged such that two poles of axially adjacent rotor laminates 3 are offset by the rotational staggering angle α. Since the poles are arranged at regular angular intervals, namely at the distance of the pole angle β, the slots 6, which are provided as a torque slot 11 for axially adjacent rotor laminates 3, are offset from one another by the rotational staggering angle α and any multiple of the pole angle β. Accordingly, the third slot 16 is offset from the first slot 14 by twice the rotational staggering angle α and any multiple of the pole angle β.

In the embodiment shown, the distances, that is to say the rotation angle γ, between the slots 6, which are provided as the torque slot 11 for axially adjacent rotor laminates 3, are the same. In particular, the rotation angle γ corresponds to the sum of the rotational staggering angle α and the pole angle β. That is, the distance between the first slot 14 and the third slot 16 is 2γ. This also means that the distance between the first slot 14 and the fourth slot 17 is 3γ. That is, the distance between the first slot 14 and the fifth slot 18 is 4γ.

Since two tongues 8 are provided in the illustrated embodiment of the rotor 1 to form the torque-transmitting connection 5, the rotor laminates have two first slots 14, two second slots 15, two third slots 16, two fourth slots 17, and two fifth slots 18, wherein the first slots 14, the second slots 15, the third slots 16, the fourth slots 17, and/or the fifth slots 18 are each opposite in the circumferential direction. Because the slots 6 are offset by the rotational staggering angle α in addition to the pole angle β, the spacing of an angle δ between the fifth slot 18 and the first slot 14 is different from the spacing of the rotation angle γ between the other circumferentially adjacent slots 6.

Thus, all of the slots 6 of the axially adjacent rotor laminates 3 can be arranged to be completely congruent. The slots 6, in particular the width of the slots 6, is matched to the rotation angle γ (and thus to the rotational staggering angle α and the pole angle β) and thus to the arrangement of the slots 6, so that the duct 10, which is formed through the coolant slots 12 is formed, is axially continuous. This means that the cross-sections of the coolant slots 12 at least partially overlap.

Figure 5:
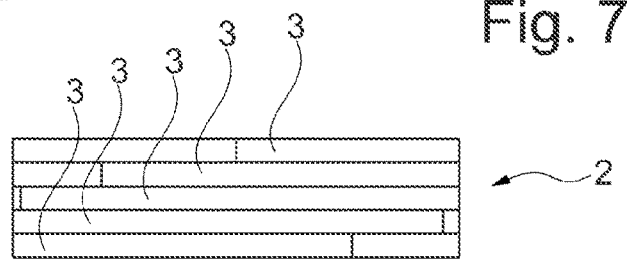
FIG. 5 shows a view from above of a laminated rotor core composed of five laminated rotor laminates.

FIG. 5 shows a view of the laminated rotor core 2 from above, in which it can be seen that the individual laminated rotor laminates 3 are arranged to be rotated relative to one another. The rotor laminates 3 are rotated with respect to one another by the same rotation angle γ, which appears different due to the curvature of the rotor laminates 3 in the view from above.

Figure 6:
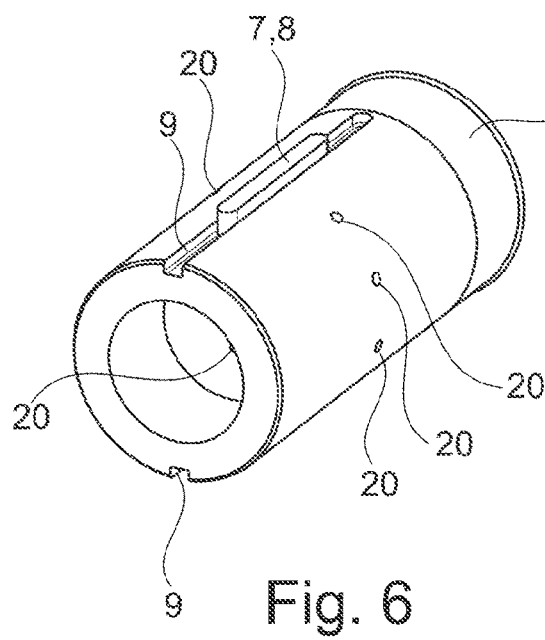
FIGS. 6 and 7 show perspective views of a rotor shaft of the rotor with a coupling element and without a coupling element.
Figure 7:
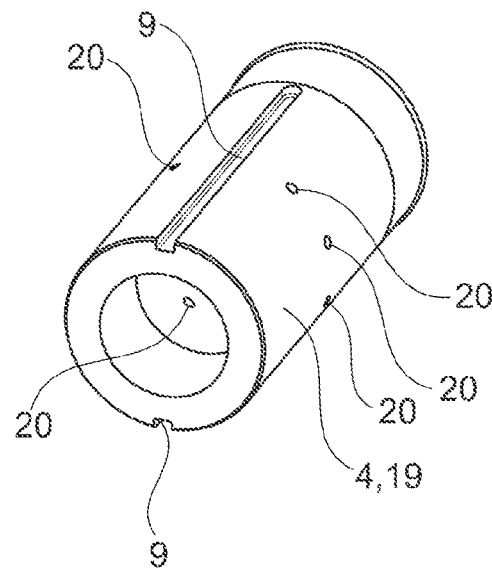
Figure 8:
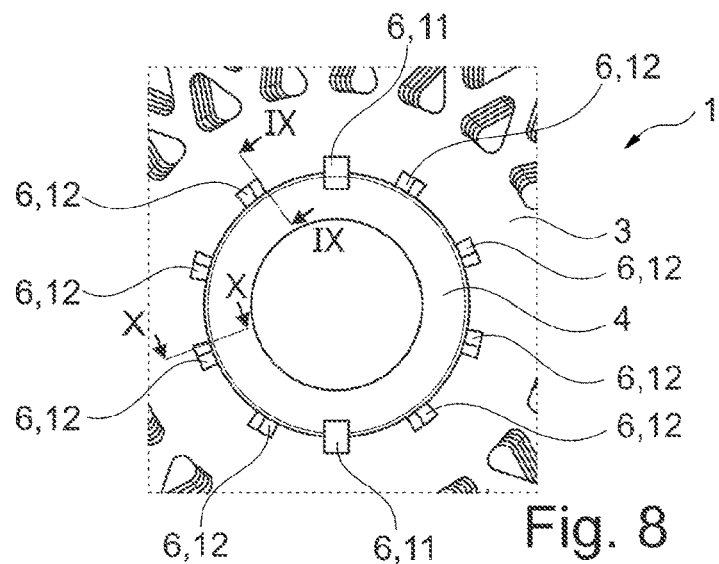
FIG. 8 shows an enlarged section from FIG. 2.

FIGS. 6 and 7 show perspective representations of the rotor shaft 4 with the tongue 8 (see FIG. 6) and without the inserted tongue 8 (see FIG. 8). The rotor shaft 4 is designed as a hollow shaft 19. The slot 9, which has a constant depth, is made on the outer circumference of the rotor shaft 4. In the embodiment shown, the rotor shaft 4 has two slots 9 which are arranged to be opposite one another. The slot 9 extends longer in the axial direction than the tongue 8. The slot 9 is open to an axial end face of the rotor shaft 4. As a result, the tongue 8 can be pushed in in the axial direction. The tongue 8 has a greater axial extent than the laminated rotor core 2.

The rotor shaft 4 has at least one duct 20 which extends in the radial direction and connects an inner circumference of the rotor shaft 4 to the outer circumference of the rotor shaft 4. The duct 19 is used to guide coolant. In the embodiment shown, several ducts 20 are formed. The ducts 20 are arranged in such a way that they open into the slots 6, in particular into the coolant slots 12, when the rotor laminates 3 are mounted on the rotor shaft 4. As a result, coolant can be guided from an interior of the rotor shaft 4 through the ducts 20 into the coolant slots 12 to the rotor laminates 3.

Figure 9:
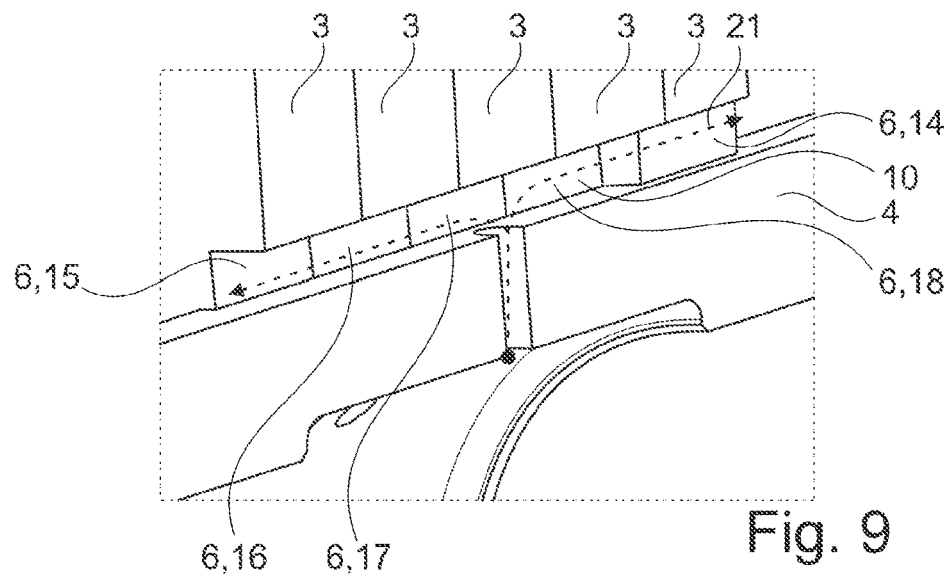
FIG. 9 shows a sectional view of the rotor, sectioned along the line IX-IX on FIG. 8.
Figure 10:
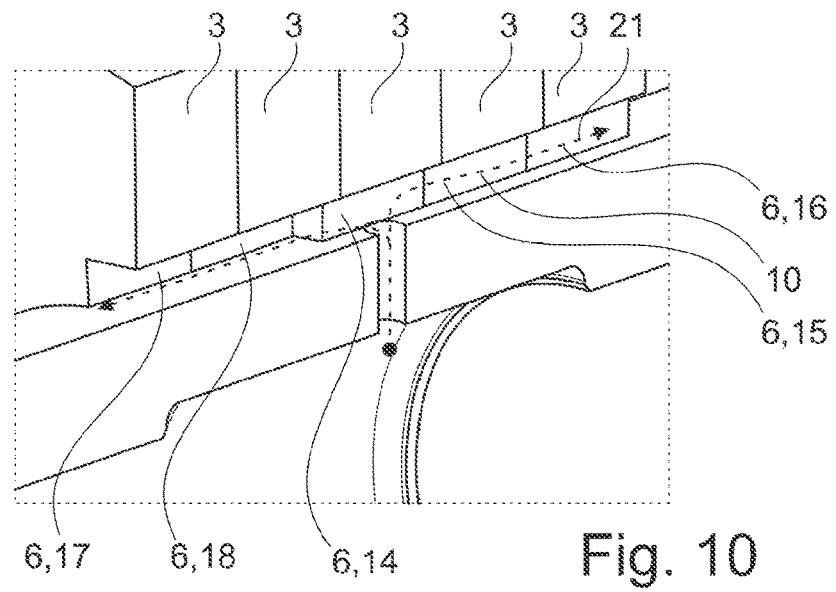
FIG. 10 shows a sectional view of the rotor, cut along the line X-X from FIG. 8.

FIGS. 9 and 10 show perspective sectional views of the rotor 1 which were cut along the line IX-IX from FIG. 8 and along the line X-X from FIG. 8, respectively. A dotted line in FIGS. 9 and 10 indicates a coolant flow 21 from the interior of the rotor shaft 4 through the duct 10. In FIG. 9 it can be seen that the second slot 15, the third slot 16, the fourth slot 17, and the fifth slot 18 completely overlap, and an offset is formed between the fifth slot 18 and the first slot 14. As a result, the first slot 14 and the fifth slot 18 only partially overlap. The continuous axial duct 10 is formed by the partial overlap between all the slots 6. In FIG. 10 it can be seen that the fourth slot 17 and the fifth slot 18 completely overlap, an offset is formed between the fifth slot 18 and the first slot 14, and the first slot 14, the second slot 15, and the third slot 16 completely overlap. As a result, the first slot 14 and the fifth slot 18 only partially overlap. The continuous axial duct 10 is formed by the partial overlap between all the slots 6. Depending on which one of the coolant slots 12 is cut through, the offset is located at a different point in the rotor core 2. In the torque slot 11, all the slots 6 completely overlap in the axial direction.

LIST OF REFERENCE SYMBOLS

1 Rotor
2 Rotor laminated core
3 Rotor laminate
4 Rotor shaft
5 Connection
6 Slot
7 Coupling element
8 Tongue
9 Slot
10 Duct
11 Torque slot
12 Coolant slot
13 Pole recess
14 First slot
15 Second slot
16 Third slot
17 Fourth slot
18 Fifth slot
19 Hollow shaft
20 Duct
21 Coolant flow
α Rotational staggering angle
β Polar angle
γ Rotation angle
δ Angle

The invention claimed is:

1. A rotor for an electrical machine, comprising:
   a rotor laminated core, which has a plurality of axially layered rotor laminates, which are each arranged at a predetermined rotation angle to an axially adjacent one of the rotor laminates;
   a rotor shaft on which the rotor laminates are fitted, wherein the rotor shaft forms a torque-transmitting connection with slots formed in the rotor laminates via at least one rotor shaft slot of the rotor shaft that is connected by one or more tongue connection to the slots formed in the rotor laminates for torque transmission, the at least one rotor shaft slot extending only along a partial axial length of the rotor shaft;

the rotor shaft is a hollow shaft in which a plurality of radially extending fluid ducts are formed for allowing fluid to flow from an inner circumference of the rotor shaft to an outer circumference of the rotor shaft, all the plurality of radially extending fluid ducts being positioned at a same axial position along an axial length of the hollow shaft; and a rotation angle and a width of the slots are matched to one another such that a duct which extends axially through the rotor is formed for fluid guidance;

wherein each said rotor laminate comprising a plurality of pole recesses for poles of the rotor, wherein the rotation angle is selected to provide a rotational staggering of the rotor laminates, a pole angle between adjacent pole recesses is different than the rotational staggering angle, and each of the plurality of pole recesses at least partially overlap a pole recess on the axially adjacent rotor laminate.

2. The rotor according to claim 1, wherein a plurality of the slots are formed in each said rotor laminate, and at least one of the slots is used for torque transmission and at least one other of the slots is used for the fluid guidance.

3. The rotor according to claim 2, wherein the fluid flowing through the plurality of radially extending fluid ducts flows into at least some of the slots.

4. The rotor according to claim 3, wherein at least as many slots are formed in each said rotor laminate as a number of the rotor laminates that form the rotor laminated core, and one of the slots forms the torque-transmitting connection depending on an axial position in the rotor laminated core.

5. The rotor according to claim 4, wherein the slots which do not form the torque-transmitting connection are used for fluid guidance.

6. The rotor according to claim 2, wherein one of the slots, which forms the torque-transmitting connection between the rotor shaft and a first one of the rotor laminates, to another of the slots, which forms the torque-transmitting connection between the rotor shaft and a next one of the rotor laminates that is axially adjacent to the first rotor laminate is offset by the rotation angle.

7. The rotor according to claim 2, wherein one of the slots, which forms the torque-transmitting connection between the rotor shaft and a first one of the rotor laminates, to another of the slots, which forms the torque-transmitting connection between the rotor shaft and another one of the rotor laminates, is axially spaced apart from the first rotor laminate, and is offset by an angle which is different from the rotation angle.

8. The rotor according to claim 1, wherein the rotor laminates have a same construction.

9. The rotor according to claim 1, wherein the one or more tongue connection is removeable from the rotor shaft slot of the rotor shaft and removeable from the slots formed in the rotor laminates.

10. The rotor according to claim 1, wherein the rotor shaft slot of the rotor shaft has a greater axial length than the one or more tongue connection.

11. A rotor for an electrical machine, comprising:

a rotor laminated core having a plurality of axially layered rotor laminates, which are each arranged at a predetermined rotation angle to an axially adjacent one of the rotor laminates;

a rotor shaft on which the rotor laminates are fitted, wherein the rotor shaft forms a torque-transmitting connection with slots formed in the rotor laminates;

a rotation angle and a width of the slots are matched to one another such that a plurality of ducts which extend axially through the rotor are formed for fluid guidance, wherein a plurality of the slots are formed in each said rotor laminate, and at least one of the slots is used for torque transmission and at least one other of the slot is used for fluid guidance; and each said rotor laminate comprising a plurality of pole recesses for poles of the rotor, wherein the rotation angle is selected to provide a rotational staggering of the rotor laminates, a pole angle between adjacent pole recesses is different than the rotational staggering angle, and each of the plurality of pole recesses at least partially overlap a pole recess on the axially adjacent rotor laminate.

12. The rotor according to claim 11, wherein the rotor shaft is a hollow shaft in which at least one radially continuously extending fluid duct is formed which flows into at least some of the slots.

13. The rotor according to claim 12, wherein at least as many slots are formed in each said rotor laminate as a number of the rotor laminates that form the rotor laminated core, and at least one of the slots in each of the rotor laminates forms the torque-transmitting connection depending on an axial position in the rotor laminated core.

14. The rotor according to claim 13, wherein the slots which do not form the torque-transmitting connection are used for fluid guidance.

15. The rotor according to claim 11, wherein one of the slots, which forms the torque-transmitting connection between the rotor shaft and a first one of the rotor laminates, to another of the slots, which forms the torque-transmitting connection between the rotor shaft and a next one of the rotor laminates that is axially adjacent to the first rotor laminate is offset by the rotation angle.

16. The rotor according to claim 11, wherein one of the slots, which forms the torque-transmitting connection between the rotor shaft and a first one of the rotor laminates, to another of the slots, which forms the torque-transmitting connection between the rotor shaft and another one of the rotor laminates that is axially spaced apart from the first rotor laminate, is offset by an angle which is different from the rotation angle.

17. The rotor according to claim 11, wherein the rotor shaft is connected by one or more tongue and slot connections to the slots formed in the rotor laminates for torque transmission.

18. The rotor according to claim 11, wherein rotor laminates have a same construction.

* * * * *